Aug. 25, 1959   M. P. FREITAS   2,901,739
DATA SCANNER MONITORING ALARM SYSTEM
Filed May 21, 1958   3 Sheets-Sheet 3
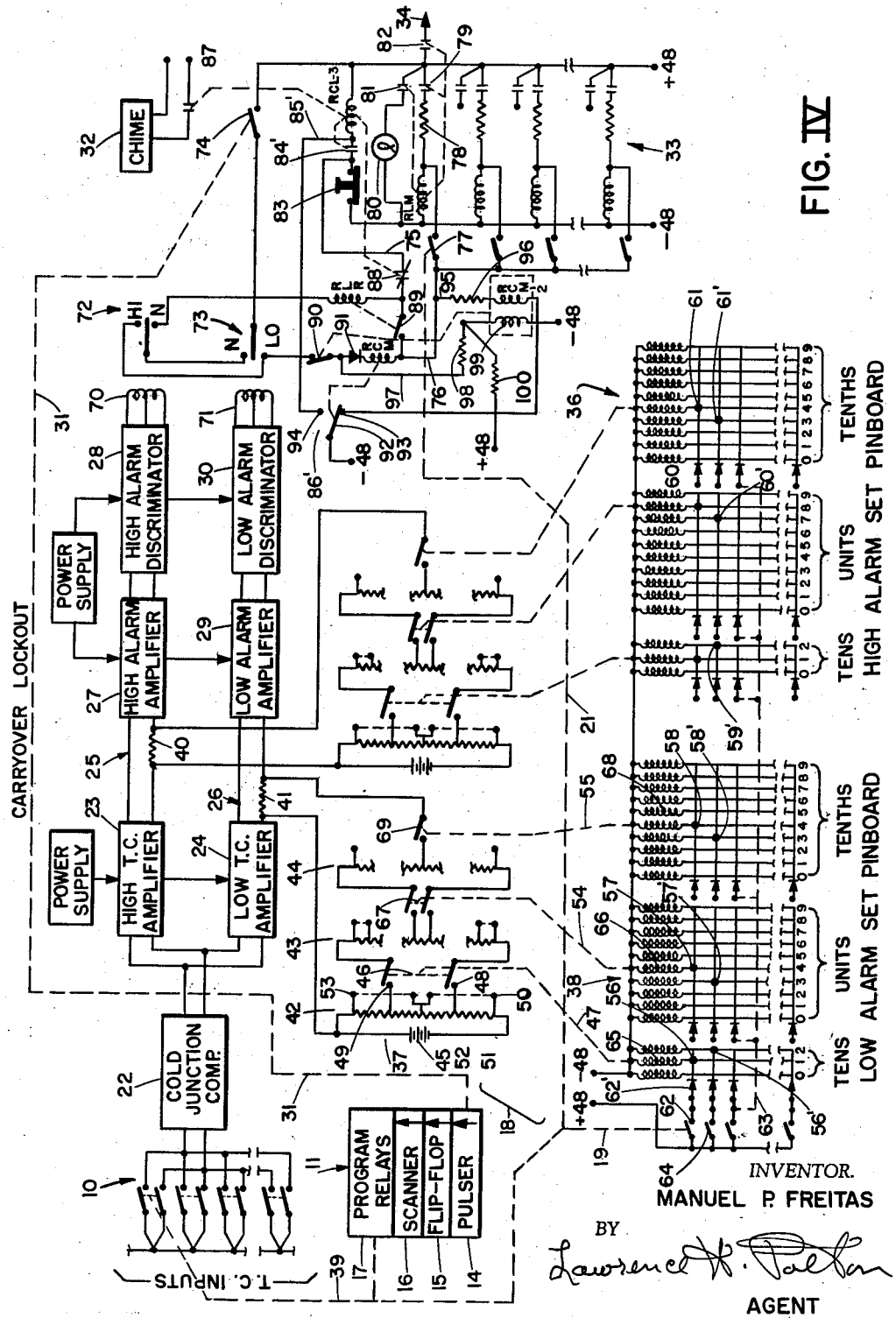
FIG. IV
INVENTOR.
MANUEL P. FREITAS
BY
Lawrence H. Patton
AGENT United States Patent Office 2,901,739
Patented Aug. 25, 1959

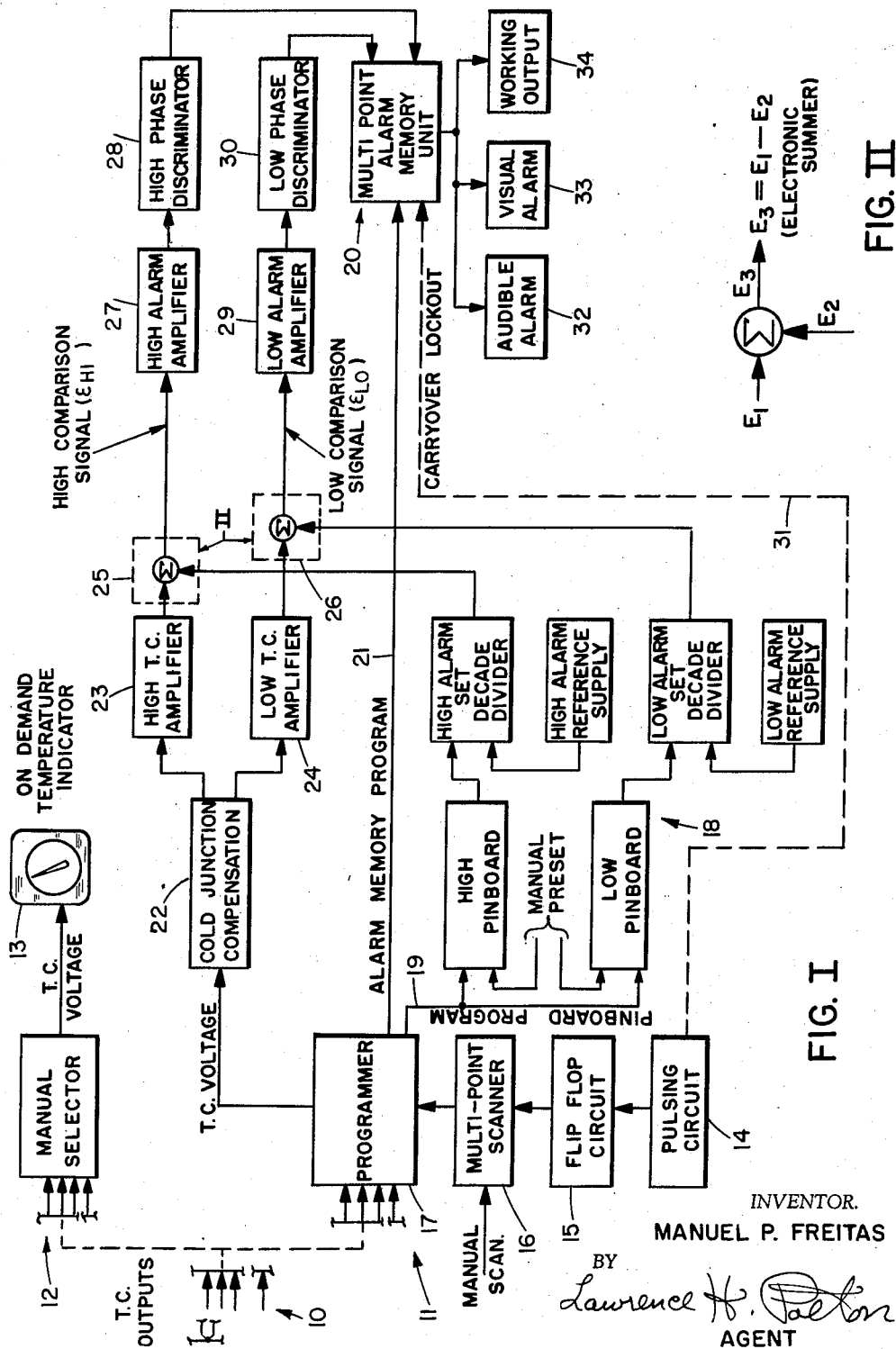

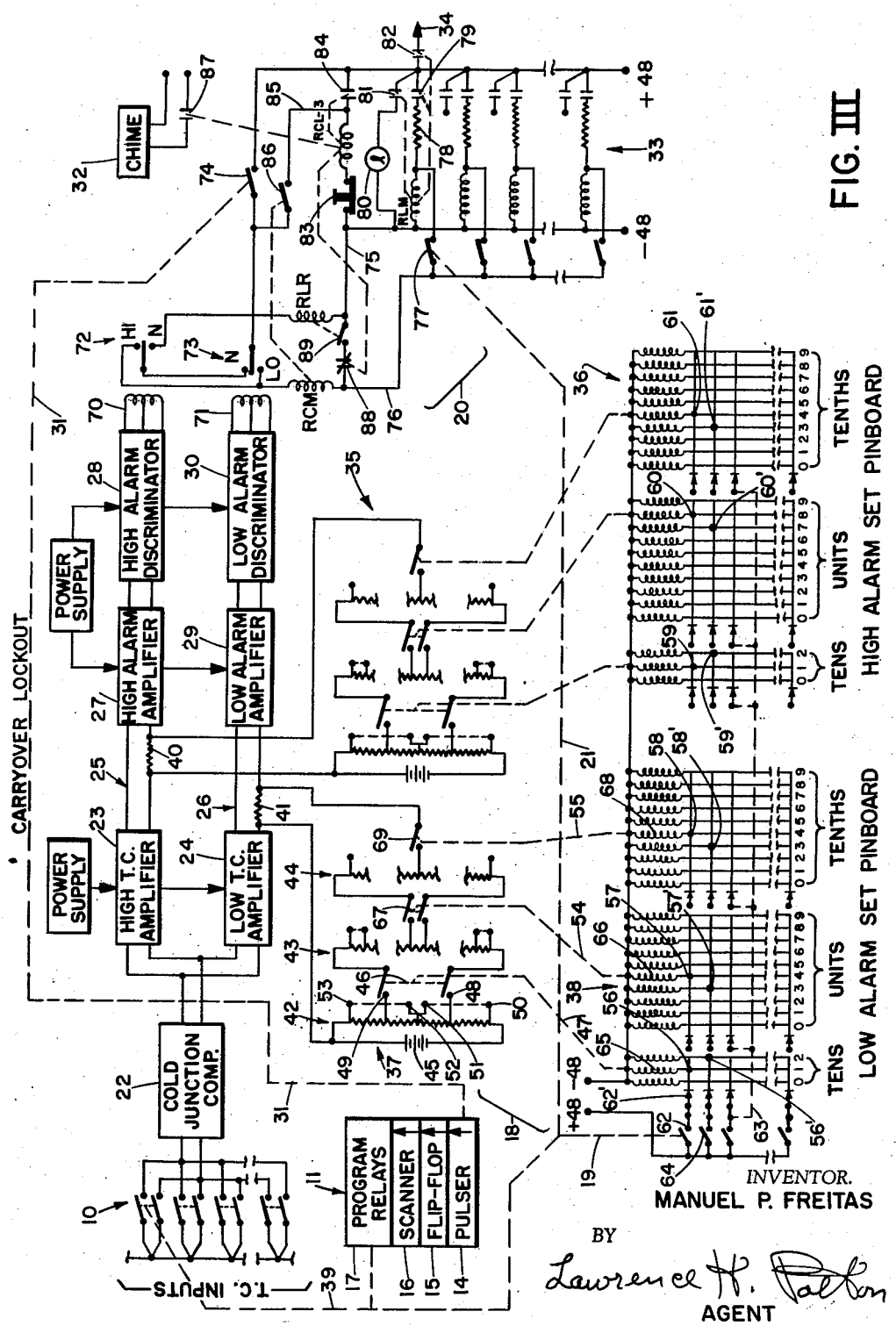

2,901,739

DATA SCANNER MONITORING ALARM SYSTEM

Manuel P. Freitas, Stoughton, Mass., assignor to The Foxboro Company, Foxboro, Mass., a corporation of Massachusetts Application May 21, 1958, Serial No. 736,885

3 Claims. (Cl. 340—213)

This invention relates to protective systems and has particular reference to systems wherein the units of a group of individual variable conditions are automatically and repeatedly measured to determine whether their values are within desired limits.

Modern industry involves complicated operations with many variable conditions which must be repeatedly checked for failures and other off-normal situations. Such variations otherwise can result in costly errors because of present-day large volume operations.

For example, in gas pipeline operation large gas compressor engines are used and the temperatures in cylinder heads must be constantly monitored. In a grouping of twenty-six compressors, as many as three hundred and thirty temperature points are so monitored as a unit operation.

This invention is directed to an alarm system for monitoring such an operation.

This invention is accomplished mainly on an electrical basis, with visual and audible alarms, wherein operation establishes whether each variable condition is within an established acceptable range of values.

It is an object of this invention to provide a new and improved data monitoring alarm system.

Other objects and advantages of this invention will be in part apparent and in part pointed out hereinafter.

In the drawings:

Figure I is a block diagram of a system according to this invention;

Figure II is a schematic illustration of a summation step as accomplished at the points indicated as at II, Figure I;

Figure III is a schematic illustration of the system of Figure I; and

Figure IV is a schematic illustration of an alternate system according to this invention, and according to the general nature of the system of Figures I and III.

With reference to Figure I, the block diagram showing therein is largely self-explanatory. It is an alarm system on a data scanning monitoring basis.

At the left of the drawing there is provided a bank 10 of thermocouple elements each of which is applied to a different temperature condition. By means of a programming system indicated generally as 11, the thermocouples in the bank 10 are individually and one at a time brought into the alarm system for a short-time measurement period. The programmer system may be arranged to select the thermocouples in any desired order and is normally arranged to start at one end of the bank and continue through to the other end and then repeat over and over.

In association with the programmer system 11 there is provided a manual selector system indicated at 12 for manual programming or spot checking with respect to the thermocouples in the bank 10, and a temperature indicator 13 is provided in association with the manual selector 12.

The programmer system 11 is automatically operated from a pulsing circuit 14 through a flip-flop circuit 15, a multipoint scanner 16 which may incorporate manual scanning means if desired, and a programmer unit 17. These various units of the programmer system 11 may be of any conventional desired circuit form (not shown). The pulsing circuit 14 is provided to give a stepping action, and the flip-flop circuit is provided to frequency divide by two the pulsing action by making a single pulse flip-flop output represent two consecutive pulses from the pulsing circuit 14. The output of the flip-flop circuit 15 operates the multipoint scanner 16 in rate and manner as desired. For example, 300 thermocouples may be scanned in a time period of the order of 60 seconds. The programmer unit 17 comprises the program relays and switches for moving from one thermocouple to another.

As the programmer selects a particular thermocouple, it also selects a related reference voltage by means of a pin-board system indicated generally at 18 through a lead 19 thereto. In addition and at the same time the programmer unit further selects, as indicated at the right of the drawing, a single section of an alarm system 20 through a lead 21 thereto.

The pin-board system 18 and the alarm system 20 are discussed in greater detail in connection with the description of Figure III hereinafter.

For every thermocouple in the temperature sensing system there is a pin-board voltage setting and an alarm unit individual thereto. As the programming is proceeded with, each program step from one thermocouple to another thus activates a separate subsystem comprising one thermocouple, and one pin-board reference voltage setting, and one alarm unit.

The manual preset shown in the pin-board system 18 refers to the practice of manually placing electrical connector pins in desired locations in the pin-board to provide high and low reference voltage connections for the purpose of providing bases of reference with the different thermocouple signals.

Again at the left of Figure I each thermocouple voltage as switched through the programmer is applied to a cold-junction compensation device 22 with the output thereof provided in duplicate and applied simultaneously to a high reference amplifier 23 and a low reference amplifier 24. The output of the high reference amplifier 23 is applied to a reference-by-summation unit 25 in relation to signals from a high reference section of the pin-board system 18. Similarly the output of the low reference amplifier 24 is applied to a reference-by-summation unit 26 in relation to signals from a low reference portion of the pin-board system 18.

Accordingly with respect to any one thermocouple the referencing devices 25 and 26 determine whether the output from this one thermocouple is above the high limit or below the low limit or within the range which is defined as between the high and low values set in the pin-board and compared in the referencing devices, 25 and 26.

The outputs of the referencing devices 25 and 26 are applied respectively to amplifiers and discriminators individual to each as indicated at 27, 28, and 29, 30, and thereafter to the alarm unit 20 simultaneously.

Again with respect to Figure I an operating control connection is provided from the pulsing circuit 14 to the alarm unit 20, as indicated at 31, as a carryover lockout. The purpose and operation of this connection will be described in connection with Figure III hereinafter.

The Figure I alarm system 20 includes an audible alarm system 32, a visual alarm system 33 and a working output 34, these also being described in more detail in connection with Figure III hereinafter.

Figure II illustrates the summation action, as indicated at II in Figure I, of both the high and the low value referencing devices 25 and 26. That is, Figure II represents either one of these devices in that E–1 is the measured voltage, E–2 is the reference voltage from the voltage divider arrangement, and E–3 is the output in summation of these two. If the signal is within the normal range in the high section the thermocouple signal will be less than the reference signal and in the low range it will be greater than the reference signal.

The devices just described, that is, the cold-junction compensation, the amplifiers, discriminators and signal comparison summation devices are all conventional devices as desired, and are therefore not shown in detail.

Figure III is a schematic of much of the structure of Figure I wherein the Figure I manual selector 12 and the indicator 13 are omitted and wherein, otherwise, like elements, systems or units are designated by like reference numerals.

In Figure III the block unit indications represent conventional circuits and devices as desired. The pin-board system 18 while essentially conventional in its general outlines is shown in some detail, although greatly abbreviated, in its support of the combination of this invention. This pin-board arrangement 18 in Figure III comprises a high signal, relay operated decade type voltage divider 35 and a high signal pin-board unit 36 associated therewith. The pin-board system further includes a low signal voltage divider unit 37 and a low signal pin-board unit 38 associated therewith. These voltage dividers and pin-board units are shown in fragment to illustrate their structure and operation without the complexity of showing all parts thereof.

The programming relationships are indicated by operating lines from the programmer, that is, line 39 to the thermocouple switches, line 19 to the pin-board switches and line 21 to the alarm system switches. These operating lines are shown from the program relay to only one of each of these groups of switches, that is to one switch in each of these groups. Such connections are individual from the program unit 17 to all of the switches. Accordingly at each program step one of the switches of thermocouple bank 10, one of the switches of the pin-board units 36 and 38 and one of the switches of the alarm system 20 are joined to make a single system for a single thermocouple in the step-by-step measurement of point temperature values. Thus for example in the thermocouple system 10 the operating line 39 goes to the top switch shown therein but the remaining three switches are also operable individually from the program unit 17, in connection with their related switches in the pin-board units 36 and 38 and in the alarm system 20.

In the Figure III system when one of the thermocouples is placed in the system by the programming, its value appears simultaneously in the outputs of the high reference amplifier 23 and the low reference amplifier 24. The value of the signal is the same in both of these amplifiers for purposes of comparison with a high reference voltage as at 25 and a low reference voltage as at 26. These high and low reference voltages are across resistors 40 and 41 respectively, and these reference voltages are produced from the voltage dividers 37 for the item 26 comparison and 35 for the item 25 comparison. These voltage dividers operate on a decimal basis. For example, in the voltage divider unit 37 there is a first resistance element 42, a second resistance element 43 and a third resistance element 44. In the resistance element 42, the whole unit 37 being powered from a battery 45, a certain portion of the resistance element 42 is selected by means of the programming system as applied to the switches of the associated pin-board unit 38. This selection results for example in the closing of a pair of switches as indicated at 46, whereby the resistance thus taken off from the over-all first resistance 42 is related to a particular thermocouple in the bank 10. There are three actuating coils in the pin-board unit 38 for the first resistor unit 42 in the voltage divider 37. These are indicated as the tens in the pin-board unit 38 and by way of illustration a single operating line 47 is shown from the number 1 element in the tens bank in the pin-board unit 38 to the switching arrangement 46 to select the resistance therebetween from the over-all resistance 42. This in the reference voltage provision accounts for the tens unit in the reference voltage, in this case 1. In the voltage divider bank 37 and in the first over-all resistance 42 therein there are three selection possibilities of partial resistances, all equal. One is as mentioned before illustrated herein and is between contacts 48 and 49. Another is between contacts 50 and 51. The third is between contacts 52 and 53.

Thus the take-off in the voltage divider unit 37 from the over-all resistance 42 is only a part thereof as indicated as selected in the tens bank of the pin-board unit 38 and this voltage take-off is applied to the second over-all resistance 43 of the divider 37. In similar fashion a part of the over-all resistance 43 is taken off and applied to the over-all resistance 44 and a point is selected therein to accomplish the over-all voltage division as from the tens, units and tenths banks of operating coils in the pin-board unit 38. Illustrative switching arrangements are shown with respect to the units and tenths of the pin-board unit 38 through operating connections 54 and 55. The location of the connector pins in the pin-board unit 38 are indicated as at 56, 57 and 58. With respect to this low value pin-board and voltage divider combination, the reference voltage which is applied across the resistance 41 in the output of the low reference amplifier 24 is a factor of 14.4 millivolts, as an example, since the connector pins are on points 1, 4 and 4 respectively of the tens, units, and tenths banks of the pin-board unit 38. Each such horizontal arrangement ties in with one of the thermocouples 10.

In like fashion for the same thermocouple the high value voltage divider 35 and pin-board unit 36 combination provides a voltage across the resistance 40 in the output of the high reference amplifier unit 23 which is a factor of 18.4 millivolts, for example, as determined by the connector pin settings in the high value pin-board unit 36 as indicated at 59, 60 and 61 respectively in the tens, units, and tenths bank of the pin-board unit 36.

As an example for another thermocouple, connector points are marked at 56', 57', 58' and 59', 60', and 61' to set up a range established from factors of 23.3 millivolts to 27.3 millivolts.

The pin-board arrangements described in connection with pin-board unit 38, also apply to the pin-board unit 36, it being constructed and operated in the same manner.

In the pin-board unit 38 a switch 62 is operated from the program unit 17 for association with a particular one of the thermocouple elements in the bank 10. The tens, units and tenths banks are connected by the closing switch 62 as indicated by the representative dotted line connection 63 which in the actual construction is applied to each of the horizontal lines upon the closing of any one of the switches such as 62, 64, and so forth. Diodes as illustrated at 62' are located throughout the pin-boards to avoid undesirable interaction between the pin-board banks and from one thermocouple to another. Thus when switch 62 is closed, there is a direct connection from a 48-volt point through the switch and to the connector pin 56. The connector pin 56 thus ties in number 1 element vertically speaking through an actuating coil 65 to complete the circuit to a —48 volt point. The actuation of the coil 65 closes the indicated pair of switches in the voltage divider unit 37 as at 46. Similarly through a connector like the illustrative connector 63 the closing of the switch 62 connects the +48 volt point through the switch 62 to the horizontal lead to the connector pin 57 in the units bank of the pin-board system. Thus the vertical connection is made through a coil 66 to the —48 voltage point as a means of closing switch pair 67 in the selection of a resistance from the over-all resistance 43 in the resistor bank 37. In similar fashion the connector pin 58 is used to bring coil 68 into play as the vertical component of the tenths bank in the pin-board arrangement to close the switch 69 in the third over-all resistor 44 of the voltage divider bank 37. Thus for each selected thermocouple there is a horizontal component selected in the pin-board unit as by switch 62 for example and there are three vertical components selected according to the placement of the selector pins such as 56, 57 and 58. The pin-board selection is thus simply a selection of an actuating coil such as 65, 66 and 68 to operate selected switches in the voltage divider bank 37 to bring into play such portions of the over-all resistors 42, 43 and 44 as will provide the desired low value of reference voltage on a decimal basis.

In this manner a reference range is provided as between the low value reference arrangement and the high value reference arrangement so that the output from any one thermocouple is compared individually and separately to both a high and low reference value to determine whether or not the output of that thermocouple is at that moment within the allowable range.

Thus while the immediate outputs of the amplifiers 23 and 24 are identical and both representative of the measured value of the same thermocouple at the same time, they are referenced against different voltages. One is the top end of the allowable range as in the high reference voltage across the resistor 40 and the other is lower end of the allowable range as in the low value voltage across the resistor 41. In order to be normal and within the given range, the comparison in the area 25 should resolve in favor of the reference voltage, that is, the thermocouple signal is less than the high limit, and the comparison in the reference area 26 should resolve in favor of the thermocouple signal voltage, which should be above the low limit.

The outputs of the discriminators 28 and 30 are applied by means of output coils 70 and 71 to operate a pair of switch units 72 and 73. Each of these switch units comprises a contact bar movable by its respective coil either to an error contact indicated in 72 as high and in 73 as low, or to a normal contact indicated as N in both switch units 72 and 73. Thus there are three possible combinations of pairs of output signals as applied to switches 72 and 73. If the thermocouple voltage is within the allowable range then the switch 72 is moved down to its normal position and the switch 73 is moved upwards to its normal position. If the thermocouple measured voltage is above the high limit then the switch 72 will be moved up to its high contact whereas the switch 73 will be moved up to its normal contact. Also if the thermocouple measured voltage is below the low limit then the switch 72 will be moved down to its normal contact and the switch 73 will be moved down to its low contact. Thus the combinations of output at this point are high normal-low normal, high error-low normal, or high normal-low error.

The alarm system 20 to which the measurement signals from the thermocouple comparison arrangement are applied to switch units 72 and 73, is an over-all circuit system which includes a normal circuit and an off-normal circuit. These circuits have some variations but they are both powered from a 48-volt source as indicated at +48, −48 at the bottom of the alarm system. The main normal circuit may be said to extend from the +48 point straight upwards and uninterrupted to the carryover lockout switch 74 and from there to the contact arm of the input signal switch 73, through the normal contact therein to the contact arm of the input switch 72, then through its normal contact point, down through a coil RLR, and through a lead 75 directly and uninterrupted to the −48 point. Thus with a normal signal, that is the thermocouple output within the allowable range of values and on the basis of no immediately previous action or lockup situation in the alarm system, the normal signal will have no effect on the system. An illustrative example of an off-normal circuit combination in the alarm system may be followed in this fashion: From the +48 point through the carryover lockup switch 74 to the input switches 72 and 73. At this point the error may be either low in the switch 73 or high in the switch 72. In either case, the off-normal circuit may be followed from the switches downward through a coil RCM and thereafter through a lead 76 to the programming actuated switch 77. In continuance, this illustrative off-normal circuit passes through another coil RLM and then directly and uninterruptedly down to the −48 point. Thus the basic off-normal signal action is to energize the coil RLM. Coil RCM is also energized at this point as will be explained hereinafter.

The coil indicated as RLM is the visual alarm coil for one of the thermocouples in the thermocouple bank 10. The other similar coils shown below in the visual alarm bank 33 are likewise individual to other thermocouples and are actuated in off-normal situations when the programming situation is such as to actuate their lead-in switches such as switch 77 and those shown below it.

Each thermocouple, therefore, has a visual alarm unit individual thereto. This alarm unit is illustrated by the representative situation shown wherein the program switch 77 is used to actuate the coil RLM. This visual alarm unit thus first comprises a series arrangement of the coil RLM, a resistor 78 and a pair of normally open contacts 79. This series arrangement is directly between the minus and plus 48-volt points. When the coil RLM is energized it closes the contacts 79 providing a lockup circuit from plus 48 to minus 48 through the contacts 79, the resistor 78 and the RLM coil. Thus this alarm unit individual to a particular thermocouple will stay locked up after that individual thermocouple measurement is terminated and the programming continues to others. In the same action of energizing coil RLM, a lamp circuit is used with a lamp 80 in series with normally open contacts 81 to form a unit arranged in parallel with the series circuit comprising coil RLM, resistor 78 and contacts 79. The contacts 81 are also closed by the energization of the coil RLM to provide a circuit from +48 through contacts 81 and lamp 80 to the −48 point. Thus the warning light is lit when an off-normal signal actuates a coil such as RLM and this is a lockup situation. In this same unit area, a working output signal may be provided as indicated at 34 through a pair of normally open contacts 82 which are also closed by the energization of the same coil RLM.

In this same off-normal situation wherein a light such as the light 80 is lit, an audible alarm system is brought into action. This audible alarm system comprises in part a series arrangement of a manual push-button reset switch 83, a coil RCL-3 and a pair of normally open contacts 84. This series arrangement is in parallel with the RLM coil series arrangement, that is, directly between the −48 and +48-volt points. The actuation of the coil RCL-3 to close the contacts 84 and energize the audible alarm system is accomplished through a lead 85 to this series arrangement between the coil RCL-3 and the contacts 84, from the +48 point through a normally open switch 86. The switch 86 is actuated by the coil RCM which as previously mentioned is in the off-normal circuit from the input switches 72 and 73. Thus when an off-normal signal in the usual sense goes through the coil RCM the switch 86 is closed and a circuit is completed from +48 through switch 86, the coil RCL-3, and the closed push-button switch 83 to the −48 point. The RCL-3 coil thus closes contacts 84 to lock up this audible alarm series arrangement and also actuates the chime unit 32 by closing a pair of normally open contacts 87 in the chime energization circuit. The coil RCL-3 has one further function, i.e. opening a normally closed contact 88. This contact 88 is in a line between the off-normal circuit as represented by coil RCM and the normal circuit as represented by coil RLR and is a part of a series arrangement therebetween comprising the normally closed contacts 88 and a normally open switch 89. The switch 89 is operable by the normal circuit coil RLR. The functions of contacts 88 and switch 89 and their cross-lead will become apparent hereinafter.

Accordingly, when a thermocouple is providing the measurement above or below the normal range, as established on a new situation without previous action, the light such as 80 which is individual to that thermocouple will light and the chime 32 will sound off. There is a different light such as 80 for each thermocouple but the chime is common to all. If left to itself, this condition will continue as the programmer moves from thermocouple to the thermocouple, and where there is an error the light will light and the chime will continue to sound off. Thus, if an operator were to leave the system for a time and through continued programming errors appeared in different thermocouples, the chime would be sounding continuously and the pertinent lights would be actuated and remain lit. This is the situation throughout the programming as long as the thermocouple giving off the error signal remains in error throughout its continuing responses to further programming.

In the usual procedure when one or more thermocouple measurements are in error the respective alarm lights will light and remain lit and the chime alarm will sound off continuously. The errors are thus called to the attention of the operator by the chime and he can see which of the thermocouple measurements are in error by the different lights. However, the chime is for the purpose of calling attention to a new error so the usual procedure is for the operator to push the reset button 83 and since the measurement has passed on by programming from the thermocouple which set this audible alarm coil RCL-3 in energization, the circuit from +48 through the series arrangement of contacts 84, coil RCL-3 and button 83 to the −48 point is broken and the chime contacts 87 are opened as well as the contacts 84, and the contact 88 is allowed to return to its normally closed condition. Thus the chime is silenced whereas the lights in the various units remain lit.

In this situation when the thermocouple signal is corrected there is an automatic reset action wtih respect to its visual alarm unit. Thus considering the coil RLM to be energized from the previous error signal, when the programming comes around to the same thermocouple again and the error has been corrected, then the new signal coming through is a normal signal operating through coil RLR to the −48 point. This normal signal closes switch 89 per coil RLR and switch 88 is closed because audible alarm coil RCL-3 is not energized due to the previous manual pushing of the reset button 83. Thus in any one visual alarm unit the coil RLM is shorted out since the −48 voltage is applied to both ends of the coil RLM, first directly and then indirectly through lead 75, switch 89, closed contacts 88, lead 76, and switch 77 to the point between coil RLM and resistor 78.

Accordingly this resetting action will extinguish the alarm lights lit by a previous error as it is applied to each of the alarm units individual to the thermocouples which have given a previous error signal. Note, however, that such resetting action cannot occur unless the chime alarm has been turned off by manually pushing the reset button 83 to allow the contacts 88 to close. As long as the chime alarm is on there can be no automatic resetting of the visible alarm system.

Each time a new error signal comes through for one of the visual alarm units the chime will be actuated unless the error signal is the second or more of a series of error signals to the same visual alarm unit from the same thermocouple. In such a case the chime alarm will be actuated the first time and presumably then the operator will push the reset button 83 to turn the chime off and if the next signal to the same unit is also an error signal, the chime will not operate. This arrangement is provided since the error signal coil RCM is in fact in parallel with the visual alarm unit resistor 78 so that when the visual alarm is activated the contacts 79 are closed and a second or more, consecutive error signal from the switches 72 or 73 in going to the point between coil RLM and resistor 78 passes through a parallel circuit arrangement comprising the coil RCM on the one hand and the resistance 78 on the other. Accordingly the current in coil RCM is substantially reduced and is not sufficient to provide the energy necessary to close the audible alarm switch 86. Thus, on the second or more, consecutive error signal in a situation where the operator has pushed the chime reset button, the chime will not sound off due to the fact that the error is already established in the visual alarm. On this basis, therefore, whenever the chime sounds off it is indicative of a new error from a new thermocouple to a new visual alarm unit.

In connection with the programming of this over-all system wherein the system is applied step by step to the thermocouples, there is an operating connection 31 from the pulser unit 14 over to the alarm system and to the carryover lockout switch 74. This arrangement is so timed that the lockout switch 74 is normally open and when the program shifts from one thermocouple to the next a short time period is allowed to pass before the carryover lockout switch 74 is closed. This time period is one pulse of the pulser unit 14. Thus the electronic circuitry has an opportunity to settle down with respect to the new signal from the new thermocouple without any carryover of the immediately previous measurement into the new signal. In the course of this waiting period the switch units 72 and 73 are actuated but the signal, either normal or off-normal, cannot be applied to any part of the visual or audible alarm circuits until the +48 side of the line is connected in by means of the closing of switch 74.

Referring to Figure IV, this is a showing of another system generally like that of Figure III, but with special construction and effects in the alarm portion thereof. In the case of Figure IV in the system prior to the alarm system the same reference numerals have been applied to the same elements as in Figure III. To some extent also in the alarm system as between Figures III and IV like reference numerals have been applied to like elements. While the entire system is shown in Figure IV for the purpose of establishing this whole system as a unit the description is limited to the Figure IV alarm system.

In the Figure IV alarm system the normal signal base circuit is from the +48 point directly to the carryover lockout switch 74, to the normal contact of input switch 73 and the normal contact of input switch 72, then through coil RLR and in this case through the normally closed chime lockout switch 88', and the chime reset pushbutton 83 to the −48 point.

On a visual alarm resetting condition situation, that is where the coil RLM is energized from a previous error and the button 83 has been pushed to release the audible alarm, a new normal signal following the error signal to one alarm unit will pass through coil RLR, switch 89 closed thereby, and switch 77 to the visual alarm series arrangement point between the RLM coil and the resistor 78 to short out the RLM coil and reset the visual alarm unit in this fashion and in the same general fashion as was accomplished in the system of Figure III.

The off-normal circuit in the Figure IV alarm system proceeds from the error contacts of input switches 72 and/or 73 downward through a normally closed switch 90, a silicone-diode rectifier 91 for passage of current in this downward direction only, and the RCM coil, to the programmed switch 77, and through visual alarm unit coil RLM to the −48 point in the usual fashion of energizing the visual alarm circuit unit to light the light 80.

The Figure IV audible alarm system is energized to actuate the chime 32 by means of a switch 86' operated by the off-normal circuit coil RCM. The switch 86' has a contact arm 92 which is connected directly to a —48 point and which is normally closed with respect to a contact 93. This switch 86' is normally open with respect to a contact 94 which is the audible alarm actuating contact. Thus an error signal through the coil RCM will engage the switch arm 92 of the switch 86' with the contact 94 and connect lead 85' directly to a —48 point. This action thus completes a circuit from +48 through RCL-3 which is the Figure IV audible alarm coil and through lead 85' and switch 86' to the —48 point. The coil RCL-3 closes contact 84' when energized and establishes a locked-up audible alarm circuit from +48 through coil RCL-3, closed contact 84', and closed reset button 83 to the —48 point. The energization of the chime coil RCL-3 actuates and closes the contacts 87 in the chime unit itself to sound off the chime. The chime alarm coil RCL-3 also when energized actuates contacts 88' to open them. With the contact 88' open the self-resetting action of a normal signal following an error signal to a single unit which ordinarily would short out coil RLM cannot do so because switch 88' is open and the circuit through the coil RLR cannot reach the —48 point to complete the circuit and therefore the coil RLR is not energized and the switch 89 is not closed. When the switch 89 is closed and switch 88' is closed through the manual actuation of the audible alarm reset button 83 to shut off the chime and yet leave the lamp 80 lit in the visual alarm unit, the normal signal following an error signal will short out coil RLM and de-energize the circuit and put out the light since the circuit through RLR can then reach the —48 point through closed contacts 88' and closed reset button 83 and therefore, switch 89 being closed, one side of RLM coil is directly led to the —48 and the other side is indirectly led to the —48 through switch 77, switch 89, contacts 88', and closed reset button 83.

A substantial difference in the Figure IV system with respect to the Figure III system lies in the off-normal circuitry wherein the switch 90 is opened to prevent the actuation of the chime alarm in a situation wherein the visual alarm unit involved is already locked up, that is the RLM coil is energized. This is the action taken to prevent sounding of the chime alarm for a second error signal to the same alarm unit after the chime alarm has been reset by pushing the manual button 83. This assures that each time the chime alarm sounds it is for a new error at a new thermocouple.

The carryover lockout switch 74 is open between pulses of the pulser unit 14 in a timed arrangement upon a new program step from one thermocouple to another and thus provides sufficient time for the electronic circuitry of amplification, discrimination, and so forth, to stabilize so there will be not carryover from one thermocouple signal to the next, and also provides sufficient time for the Figure IV alarm circuitry to determine whether or not there is voltage across the visual alarm unit coil RLM. If there is voltage across RLM then it means that the new off-normal signal coming through is the second or more of a series and it is not desirable to set off the chime alarm. The determination of the voltage across the RLM coil is accomplished by a volt-meter type of sampling arrangement wherein a take-off 95 in the off-normal circuit line 76 between the coil RCM and the program switch 77 is provided to lead through a resistor 96 and a coil RCM-2 to and through the switch 86' by means of the closed arrangement of arm 92 and contact 93, to the —48 point. Thus if there is a voltage across visual alarm coil RLM there is a voltage across RCM-2 coil and this voltage opens the switch 90.

In the off-normal circuitry of Figure IV from the off-normal contacts of switches 72 and 73 there is a lead through normally closed switch 90, through diode 91, through the off-normal RCM coil, lead 76, and program switch 77 to the visual alarm unit to energize the coil RLM in the usual fashion. There is a take-off 97 in this off-normal circuit input between the switch 90 and the diode 91 which leads through a resistor 98 and a coil 99 in opposition to the RCM-2 coil to a —48 point such that, the coil 99 tends to keep the switch 90 closed. A bias from a +48 point through resistor 100 is also applied to the coil 99 in aid of this function. Thus in order for the switch 90 to be opened it is necessary that there be a voltage across one of the RLM coils which in turn is felt across the sampling coil RCM-2 and this action will result in overcoming the effect of coil 99 and in the opening of switch 90. If switch 90 is opened then coil RCM is not energized and switch 86' cannot make contact between arm 92 and contact 94 and therefore the alarm coil RCL-3 cannot be energized.

In addition to the delaying action of the carryover lockout switch to enable the circuitry to become stabilized and to enable the RCM-2 coil to sample the voltage across RLM coil, there is a delay action involved in the off-normal signal input system wherein in the case of a new off-normal, that is a situation where the involved RLM coil series is not already locked up, the incoming off-normal signal would tend to pass through the RCM-2 coil and open the switch 90 before the RLM coil is suitably energized and the visual signal unit locked up. Under these conditions the take-off lead 97 through the coil 99 provides a sufficient opposition to the action of the RCM-2 coil to maintain the switch 90 in its closed position until the RLM coil is locked up.

Accordingly while the circuitry of Figures IV and III are generally similar in the alarm system as well as in the approach thereto the circuitry of Figure IV provides a different approach for special situations to accomplish the desired functions of establishing a visual and audible alarm for any initial error signal in an off-normal condition and, second, to enable the resetting of a visual alarm by a normal signal following an off-normal signal to the same unit, providing the chime has been reset, and, further, providing that the chime will not be actuated upon repeated off-normal signals to the same visual unit after manual reset after the first one, so that each time the chime sounds it is known that this is the indication of a new error from a new thermocouple.

The action of the diode 91 in the off-normal input signal lead is to prevent actuation of the bucking coil 99 by means of currents in reverse action through the RCM coil.

This invention, therefore, provides a new and improved data scanner monitoring alarm system.

As many embodiments may be made of the above invention and as changes may be made in the embodiments set forth above without departing from the scope of the invention, it is to be understood that all matter hereinbefore set forth or shown in the accompanying drawings is to be interpreted as illustrative only and not in a limiting sense.

I claim:
1. A visual and audible automatic alarm system for monitoring a group of variable conditions on the basis of scanning representatives of said conditions and producing normal and off-normal signals individually with respect thereto, said system comprising, in combination, means for producing said signals, and an electrical alarm system responsive to said signals, said alarm system comprising a multiple-unit visual alarm system and a single-unit audible alarm system operably common to all of said visual alarm units, said visual alarm system comprising a normal circuit and an off-normal circuit, means for individually locking up said visual alarm units upon the application of off-normal signals thereto, means for individually resetting said visual alarm units in locked-up condition upon the application of normal signals thereto, means for locking up said audible alarm system upon the application of an off-normal signal to any one of said visual alarm units, manual means for resetting said audible alarm system, and means for preventing the actuation of said audible alarm system by an off-normal signal to any one of said visual alarm units in the situation wherein said last-named one of said visual alarm units is locked up and said audible alarm system has been manually reset.

2. A visual and audible automatic alarm system for monitoring a group of variable temperature conditions on the basis of scanning representations of said conditions and producing normal and off-normal signals with respect thereto, said system comprising, in combination, a multiple unit electrical measurement system, a multiple unit electrical reference system, an operating signal system wherein signals in said measurement system are electrically compared to signals in said reference system and the results electrically developed as operating signals, a multiple unit electrical alarm system to which said operating signals are applied, an electrical pulsing unit, and a programming system operated by said pulsing unit for step-by-step connection of a series of subsystems into individual, one at a time operativeness, each of said subsystems comprising one of said measurement units, one of said reference units, said operating system, and one of said alarm units, said measurement system comprising a series of thermocouple temperature sensing elements, said reference system comprising a high reference multiple voltage divider, a high reference pin-board selector unit therefor, a low reference multiple voltage divider, and a low reference pin-board selector unit therefor, said operating system comprising means for referencing the output signal of each said thermocouples, as individually presented, simultaneously and separately against both of the outputs of said high and low reference voltage dividers according to the operation of said programming system, and means for amplifying and identifying the results of said referencing to provide, for each scan point, one pair of simultaneous output signals from a group of possible pairs comprising, high normal-low normal, high error-low normal, and high normal-low error, said alarm system being actuatable by said output signals and comprising a direct current circuit system including a normal circuit and an off-normal circuit, with said normal circuit energized only on said high normal-low normal output signal combination, and with said off-normal circuit energized by said high error-low normal signal alone and by said high normal-low error output signal alone, a series of visual alarm units each individual to one of said thermocouples and selectable one at a time by said programming system as a part of said off-normal circuit, said visual alarm units each comprising a first electrical series arrangement of an operating coil (RLM), a resistance, and a pair of normally open lock-up contacts actuated by said coil (RLM) to complete and lock-up said first series arrangement in said off-normal circuit, a second electrical series arrangement, in parallel with said first series arrangement, comprising an alarm light with a second pair of normally open contacts also actuated by said first series arrangement coil (RLM), and an actuation lead through a selector switch from said off-normal circuit to said first series arrangement between said first series coil (RLM) and said first series resistance to actuate said first series coil (RLM), and an audible alarm system wherein a chime alarm is common to all of said visual alarm units upon initial energization of any one of said alarm units from an off condition thereof, said audible alarm system comprising an electrical series arrangement, in said off-normal circuit, of a normally closed manual button switch, a chime operating coil (RCL–3), and a pair of normally open chime lock-up contacts actuated by said chime coil to complete and lock-up said chime series arrangement, a chime circuit, a pair of chime contacts in said chime circuit and actuated by said chime coil, a chime actuating lead to said chime series arrangement between said chime coil (RCL–3) and said chime lock-up contacts, a normally open chime switch in said chime actuating lead, and a chime switch actuating coil (RCM), in said off-normal circuit and, with respect to each visual alarm unit, parallel to the resistance thereof, said actuating coil (RCM) being energized at least partially each time there is an error signal in said error circuit, a visual alarm self-resetting system comprising a resetting coil (RLR) in said normal circuit, a resetting lead between said normal circuit and said off-normal circuit, a normally open resetting switch in said resetting lead and operated by said resetting coil (RLR), and a normally closed chime lock-out switch also in said resetting lead, whereby, for any one visual alarm unit, when said chime lock-out switch is closed, a normal signal following an error signal will de-energize said last named alarm unit coil (RLM) by closing said resetting switch and thereby shorting out said last named coil (RLM), a chime lock-out system comprising said normally closed chime lock-out switch in said resetting lead and operable by said chime operating coil (RCL–3) whereby only the first error signal to any one visual alarm unit after an off condition thereof is capable of energizing said chime, providing manual chime reset follows said last-named first error signal, because of reduced current in said chime switch coil (RCM) when locked up contacts in one of said visual alarm units makes the resistance thereof a shunt with respect to said chime switch coil (RCM), and a carryover lock-out system comprising a lead common to both of said normal and error circuits, a cut-out switch in said common lead and operable without affecting any of said lock-up means, and means for operating said cut-out switch from said programming system pulsing unit to open said cut-out switch in timed arrangement with each scanning step of the over-all system to prevent modification of the effects of any one scanning step on said alarm system, by the effects of the scanning step immediately previous thereto.

3. A visual and audible alarm system for monitoring a group of variable temperature conditions on the basis of scanning representations of said conditions and producing normal and off-normal signals with respect thereto, said system comprising, in combination, a multiple unit electrical measurement system, a multiple unit electrical reference system, an operating signal system wherein signals in said measurement system are electrically compared to signals in said reference system and the results electrically developed as operating signals, a multiple unit electrical alarm system to which said operating signals are applied, an electrical pulsing unit, and a programming system operated by said pulsing unit for step-by-step connection of a series of subsystems into individual, one at a time operativeness, each of said subsystems comprising one of said measurement units, one of said reference units, said operating system, and one of said alarm units, said measurement system comprising a series of thermocouple temperature sensing elements, said reference system comprising a high reference multiple voltage divider, a high reference pin-board selector unit therefor, a low reference multiple voltage divider, and a low reference pin-board selector unit therefor, said operating system comprising means for referencing the output signal of each of said thermocouples, as individually presented, simultaneously and separately against both of the outputs of said high and low reference voltage dividers according to the operation of said programming system, and means for amplifying and identifying the results of said referencing to provide, for each scan point, one pair of simultaneous output signals from a group of possible pairs comprising, high normal-low normal, high error-low normal, and high normal-low error, said alarm system being actuatable by said output signals and comprising a direct current circuit system including a normal circuit and an off-normal circuit, with said normal circuit energized only on said high normal-low normal output signal combination, and with said off-normal circuit actuatable by said high error-low normal signal alone and by said high normal-low error output signal alone, a series of visual alarm units each individual to one of said thermocouples and selectable one at a time by said programming system as a part of said off-normal circuit, said alarm units each comprising a first electrical series arrangement of an operating coil (RLM), a resistance, and a pair of normally open lock-up contacts actuated by said coil (RLM) to complete and lock-up said first series arrangements in said off-normal circuit, a second electrical series arrangement, in parallel with said first series arrangement, comprising an alarm light and a second pair of normally open contacts also actuated by said first series arrangement coil (RLM), an actuation lead through a selector switch from said off-normal circuit to said first series arrangement between said first series coil (RLM) and said first series resistance to actuate said first series coil (RLM), and, in said actuation lead prior to said selector switch, a third electrical series arrangement in order from the off-normal circuit of a normally closed off-normal cut-out switch, a diode for passing current in the input direction, and a chime switch actuating coil (RCM), and an audible alarm system wherein a chime alarm is common to all of said visual alarm units upon initial energization of any one of said alarm units from an off condition thereof, said audible alarm system comprising a fourth electrical series arrangement, in said off-normal circuit, of a normally closed manual button switch, a chime operating coil (RCL-3), and a pair of normally open chime lock-up contacts actuated by said chime coil to complete and lock-up said chime series arrangement, a chime circuit, a pair of chime contacts in said chime circuit and actuated by said chime coil, a chime actuating lead to said chime series arrangement between said chime coil (RCL-3) and said chime lock-up contacts, a normally open chime switch in said chime actuating lead, and operable by said chime switch actuating coil (RCM), a chime control system comprising a voltage sampling off-normal cut-out coil (RCM-2) in parallel with each of said operating coils (RLM), by program selection, for opening said third series switch, and a bucking coil for opposing said sampling coil when said third series switch is closed, a visual alarm self-resetting system comprising a resetting coil (RLR) in said normal circuit, a resetting lead between said normal circuit and said off-normal circuit, a normally open resetting switch in said resetting lead and operated by said resetting coil (RLR), and a normally closed chime lock-out switch whereby, for any one visual alarm unit, when said chime lock-out switch is closed, a normal signal following an error signal will de-energize said last-named alarm unit coil (RLM) by closing said resetting switch and thereby shorting out said last named coil (RLM), a chime lock-out system comprising said normally closed chime lock-out switch operable by said chime operating coil (RCL-3) whereby only the first error signal to any one visual alarm unit after an off condition thereof is capable of energizing said chime, providing manual chime reset follows said last named first error signal, because of zero current in said chime switch coil (RCM) when the open condition of said off-normal cut-out switch is accomplished by said cut-out switch coil (RCM-2), and a carryover lockout system comprising a lead common to both of said normal and error circuits, a cut-out switch in said common lead and operable without affecting any of said lock-up means, and means for operating said cut-out switch from said programming system pulsing unit to open said cut-out switch in timed arrangement with each scanning step of the over-all system to prevent modification of the effects of any one scanning step on said alarm system, by the effects of the scanning step immediately previous thereto, and to allow said sampling coil (RCM-2) to operate.

References Cited in the file of this patent

UNITED STATES PATENTS

| | | |
|---|---|---|
| 2,493,548 | Proctor | Jan. 3, 1950 |
| 2,600,132 | Seaton | June 10, 1952 |
| 2,730,703 | Ross | Jan. 10, 1956 |
| 2,731,627 | Herbst | Jan. 17, 1956 |